United States Patent [19]
Chen et al.

[11] Patent Number: 6,128,648
[45] Date of Patent: Oct. 3, 2000

[54] INFORMATION HANDLING SYSTEM AND METHOD FOR MAINTAINING COHERENCY BETWEEN NETWORK SERVERS AND MOBILE TERMINALS

[75] Inventors: Ming-Syan Chen; Kun-Lung Wu, both of Yorktown Heights; Philip Shi-lung Yu, Chappaqua, all of N.Y.

[73] Assignee: International Business Machines Corporation, Armonk, N.Y.

[21] Appl. No.: 08/344,325

[22] Filed: Nov. 23, 1994

[51] Int. Cl.⁷ .................................................. G06F 15/163
[52] U.S. Cl. .......................................................... 709/213
[58] Field of Search ........................ 395/200.02, 200.03, 395/200.09, 200.1, 200.2, 835, 402, 403, 405, 450, 453, 468, 182.02, 182.03, 182.04, 600, 650, 800; 364/132; 370/94.1, 94.2; 709/213

[56] References Cited

U.S. PATENT DOCUMENTS

| | | | |
|---|---|---|---|
| 4,714,992 | 12/1987 | Gladney et al. ......................... | 395/600 |
| 4,714,996 | 12/1987 | Gladney et al. ......................... | 395/600 |
| 4,807,224 | 2/1989 | Naron et al. ............................ | 370/94.1 |
| 4,827,399 | 5/1989 | Shibayama .............................. | 395/600 |
| 5,008,853 | 4/1991 | Bly et al. ................................ | 395/153 |
| 5,151,989 | 9/1992 | Johnson et al. ......................... | 395/600 |
| 5,210,753 | 5/1993 | Natarajan ................................ | 370/95.1 |
| 5,261,069 | 11/1993 | Wilkinson et al. ...................... | 395/472 |
| 5,315,703 | 5/1994 | Matheny et al. ........................ | 395/164 |
| 5,434,994 | 7/1995 | Shaheen et al. ......................... | 395/600 |
| 5,448,727 | 9/1995 | Annevelink .............................. | 395/600 |
| 5,452,447 | 9/1995 | Nelson et al. ............................ | 395/650 |
| 5,490,270 | 2/1996 | Devarakonda et al. ................. | 395/600 |
| 5,497,463 | 3/1996 | Stein et al. .......................... | 395/200.03 |
| 5,537,574 | 7/1996 | Elko et al. ............................... | 395/468 |
| 5,560,005 | 9/1996 | Hoover et al. ........................... | 395/600 |

OTHER PUBLICATIONS

"Sleepers and Workaholics: Caching Strategies in Mobile Environments," *SIGMOD Record*, vol. 23, No. 2, Jun. 1994, pp. 1–12.

"Large Granularity Cache Coherence for Intermittent Connectivity," 1994 *Summer USENIX*, Jun. 1994, pp. 279–289.

"Disconnected Operation in the Coda File System," *ACM Transactions on Computer systems*, vol. 10. No. 1, Feb. 1992, pp. 3–25.

*Primary Examiner*—Larry D. Donaghue
*Attorney, Agent, or Firm*—Kevin M. Jordan; David M. Shofi

[57] ABSTRACT

A communications system and method include an efficient cache invalidation technique which allows a computer to relocate and to disconnect without informing the server. The server partitions the entire database into a number of groups. The server also dynamically identifies recently updated objects in a group and excludes them from the group when checking the validity of the group. If these objects have already been included in the most recent invalidation broadcast, the remote computer can invalidate them in its cache before checking the group validity with the server. With the recently updated objects excluded from a group, the server can conclude that the cold objects in the group can be retained in the cache, and validate the rest of the group.

8 Claims, 6 Drawing Sheets

INFORMATION HANDLING SYSTEM AND METHOD FOR MAINTAINING COHERENCY BETWEEN NETWORK SERVERS AND MOBILE TERMINALS

BACKGROUND OF THE INVENTION

1. Field of the Invention

The present invention relates to communications systems and more particularly to communications systems including mobile computing systems.

2. Prior Art

In a mobile computing environment, a large number of battery-powered, portable machines can be used by many users to query information and database servers from various places through wireless communication channels. These mobile computers may often be disconnected for prolonged periods of time in order to conserve the battery energy. They may also frequently move from one cell to another and connect to different data servers at different times, enabling unrestricted mobility of the users. Due to the unlimited mobility, users of mobile computers can satisfy their information needs whenever and wherever they want.

Generally, the bandwidth of the wireless communication channel is very limited. Thus, caching of frequently used data in a mobile computer can be an effective technique to reduce the wireless bandwidth requirement. Once caching is used, however, a cache invalidation strategy is needed to ensure the data cached in the mobile computer are coherent with those in the server.

There are generally two different prior art approaches to cache invalidation, depending on whether or not the servers are aware of which data objects are being cached by which mobile computers. In a first prior art approach, the server maintains the cache state of each mobile computer and is called a statefull server. Cache invalidation can be done via sending an invalidation message to the appropriate mobile computers whenever an object is updated in the server. The server must also keep track of the on-off status of each mobile computer. In case a mobile computer fails, the server may lose track of the cache state of the mobile computer. Thus, a mobile computer must inform the server whenever it wants to disconnect itself or whenever it wants to move from one cell to another cell, significantly restricting the freedom and mobility of the mobile user.

In a second prior art approach, the server does not keep track of the cache state of each mobile computer and is called a stateless server. It does not even know which mobile computers are currently active. Cache invalidation is typically done via periodically broadcasting an invalidation report, which contains the IDs of objects that are most recently updated. Each mobile computer listens, if active, to the report and invalidates its cache contents accordingly. However, when a mobile computer is disconnected for energy-saving purpose, it may miss many invalidation broadcasts. As a result, when it wakes up, it may have to discard the entire cache contents because it does not know whether or not some of its cached objects have been updated since it went to sleep. Discarding the entire cache content after a disconnection is very costly because most of the benefits of caching to save bandwidth requirement are lost. It is also unnecessary to discard the entire cache content because most of the cached objects in the mobile computers may be updated rather infrequently and can be salvaged even after a prolonged disconnection.

To salvage some of the cached objects after a disconnection, the mobile computer can check with the server. Even though the server is stateless, it can maintain the object update history. One simple way of validity checking is to send all the IDs of its cached objects to the server. This is called simple checking (SC). However, simple checking requires a high communication overhead especially if the cache size is large.

To reduce the communication overhead, the database objects in the server can be partitioned into groups and a mobile computer can check the validity of a group, instead of each individual object. If the entire group has not been updated, the group can be salvaged. However, if any object within a group has been updated, the entire group has to be discarded from the cache. This is called simple grouping (SG). In SG, if the group size is large, discarding the entire group can also be costly and unnecessary.

Each of the prior art caching techniques identified above have disadvantages which reduce system efficiency as a result of large communications overhead required to update the cache of a remote computer.

SUMMARY OF THE INVENTION

Therefor, it is an object of the present invention to allow a computer to move from one cell to another without informing a server and to disconnect from the server for saving battery energy but, when it wakes up, still retain most of its cached storage.

In accordance with a preferred embodiment of the present invention a communications system and method including an efficient cache invalidation technique allows a computer to relocate and to disconnect without informing the server. The server partitions the entire database into a number of groups. The server also dynamically identifies recently updated objects in a group and excludes them from the group when checking the validity of the group. If these objects have already been included in the most recent invalidation broadcast, the remote computer can invalidate them in its cache before checking the group validity with the server. With the recently updated objects excluded from a group, the server can conclude that the cold objects in the group can be retained in the cache, and validate the rest of the group. This technique is referred to as Grouping with COld update set REtention (GCORE). GCORE is energy efficient because it allows a mobile computer to disconnect at any time to save energy and still retains most of the cache contents if they have not been updated and thus are considered to be cold update set. Moreover, it does not incur a high communication overhead by using grouping of data.

In a preferred embodiment, GCORE is used to support energy-efficient caching in a remote computing system. Database objects are partitioned into a small number of groups. To retain the cold objects in a group that have not been updated, the server maintains for each group an object update history of the past W broadcast intervals, consisting of a list of object IDs and their most recent update times, and the most recent update time of the group. Periodically, the server broadcasts an invalidation report containing the last w broadcast intervals of object update history. If a remote computer is active, it invalidates its cache entries based on the invalidation report. In case this broadcast report is the first one received since the remote computer has woken up, it also sends to the server an uplink message, containing the group ids and the timestamp of the latest broadcast report received before it became disconnected. The server checks the validity of a group by examining whether or not all the objects updated since the mobile computer becomes disconnected have been included in the latest broadcast report.

After receiving the validity report from the server, the just woken-up remote computer then processes its queries initiated since it has woken up. Thus, in GCORE cache invalidation is accomplished by an asymmetrical approach where a server periodically broadcasts invalidation reports and a remote computer can check its cache validity after disconnection and reconnection.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
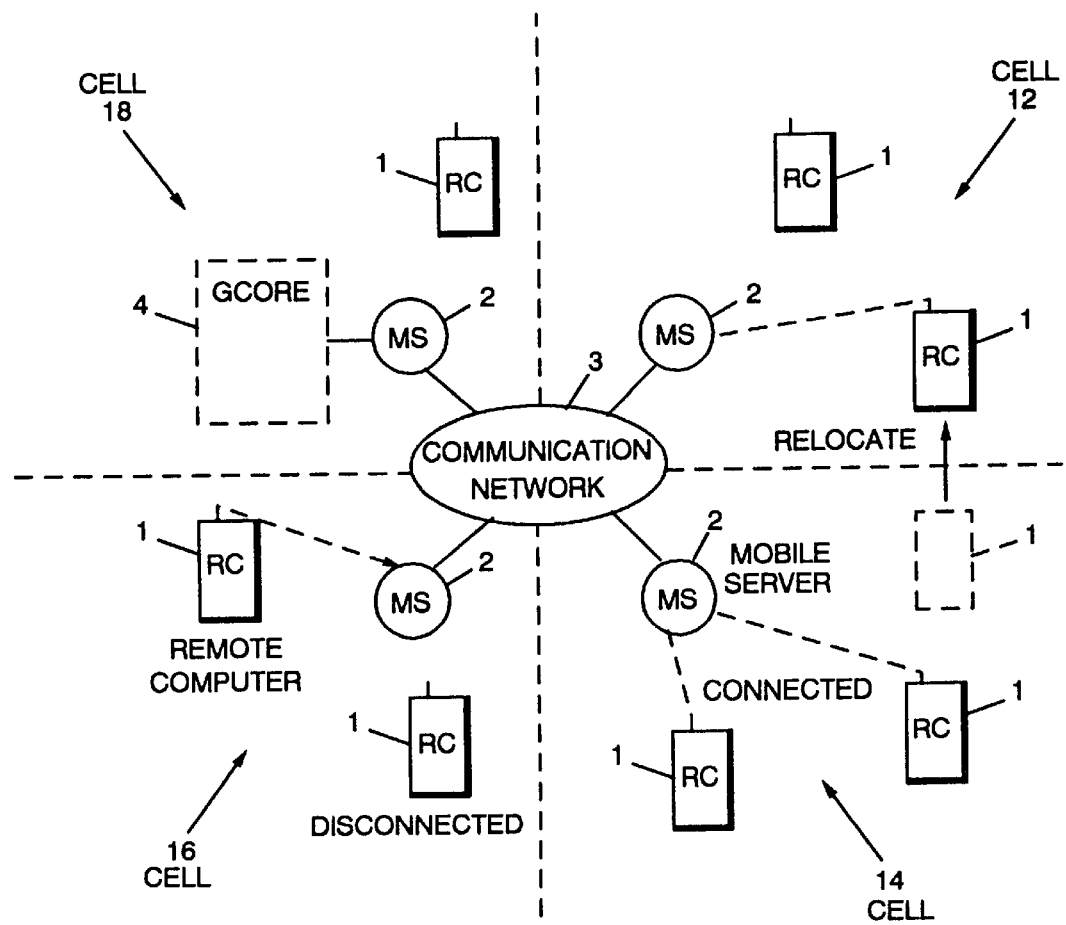
FIG. 1 is a block diagram of a communications system embodying the present invention.

Referring now to FIG. 1, a block diagram of a communications system according to a preferred embodiment of the present invention will be described.

In the following description, it is assumed that database objects are maintained on the servers 2 which are connected by a communication network 3. It is also assumed that the database is replicated on each mobile server 2. Thus, a remote computer can query the database from any wireless radio cell. Remote computers 1 can connect to one of the servers 2 by a wireless communication channel. For the purpose of cache invalidation, when a computer 1 relocates from one wireless radio cell 12, 14, 16, 18 to another cell 14, 16, 18, 12, it need not notify any of the servers 2. Queries are executed on the remote computers 1 while updates to the databases are only executed on the servers 2. In order to process queries with the more up-to-date data, queries are batched and processed right after a remote computer 1 receives a new broadcast report. Once referenced by queries, database objects are cached in the remote computers' 1 nonvolatile memory, such as hard disks (not shown) in the remote computers 1. Periodically, servers 2 broadcast invalidation reports containing the object IDs and their most recent update times. If active, a remote computer 1 then invalidates its local cache according to the invalidation report. In order to retain the benefits of caching while allowing remote computers 1 to disconnect (power off) or relocate at will, the servers 2 implement a cache invalidation technique called grouping with cold update set retention (GCORE) 4.

A server 2 broadcasts an invalidation report every L units of time. Namely, invalidation reports are broadcast at . . . , T−2L, T−L and T. To implement GCORE, three important data structures are maintained by the servers 2. The first one, curlist, contains a list of pairs of (oid, time) for each distinct object updated since the last invalidation broadcast, where oid is the object identifier and time is the object update time.

```
struct pair
{
    int oid; /* object identifier */
    double time; /* object update time */
}
    struct pair *curlist; /* a pointer to a list of pairs */
```

The second one, bcast_report, contains the broadcast time and a list of pairs of objects updated in the most recent w broadcast intervals.

```
struct bcast_report
{
    double time; /* broadcast time */
    struct pair *uplist; /* a pointer to a list of pairs */
}
```

The third one, grouptbl, contains an array of group entries and is used to maintain the update history for each group. The server 2 maintains the update history for each group for the most recent W broadcast intervals, where $W \geq w$. struct group_entry

```
{
    double time; /* most recent update time for a group */
    int tot_wW; /* total number of distinct objects most recently */
        /* updated between T-WL and T-wL */
    struct pair *uplist; /* a pointer to a list of pairs */
}
struct group_entry grouptbl[ ];
```

The grouping function can be as simple as a modulo function where the number of objects in each group is about the same. On the other hand, the grouping function can also be different for different types of objects, resulting in different group sizes. Whatever grouping function is chosen, it must be agreed upon between the servers 2 and the remote computers 1. It is assumed that the latest broadcast time (latest_bcast_time) is kept in the nonvolatile memory (not shown) of each remote computer 1 so that after a remote computer 1 wakes up it can obtain this information.

Figure 2:
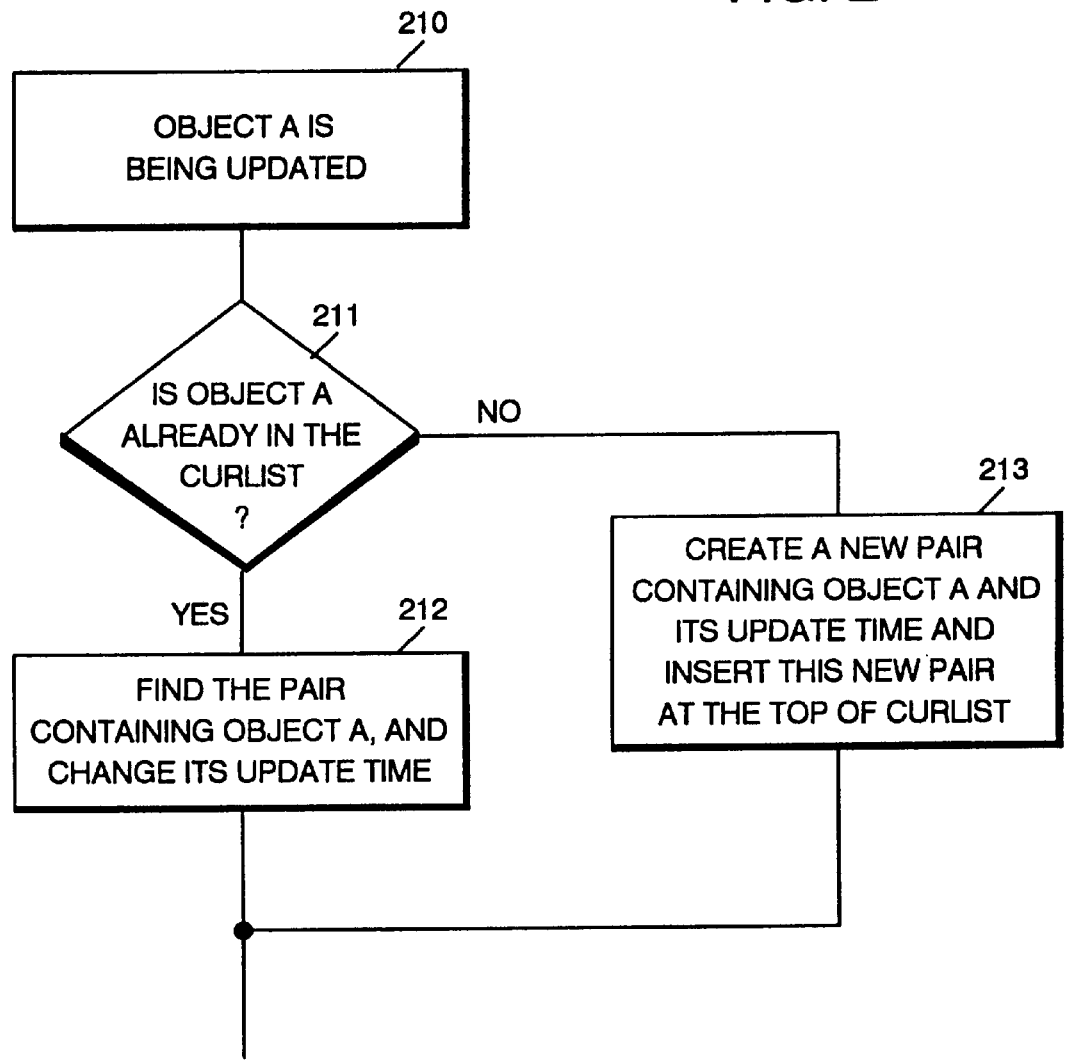
FIG. 2 is a flow diagram of a process for maintaining a list of data objects updated since last broadcast.

For every object updated, the server 2 executes two processes: insert_curlist and insert_grouptbl. FIG. 2 shows the flow chart for insert_curlist. When object A is being updated 210, the curlist is checked to see if there is a pair that has the same object identifier as A 211. If yes, then the update time of this pair is changed to the current time 212. Otherwise, a new pair is created containing the object ID A and the current update time and is inserted at the top of curlist 213.

Figure 3:
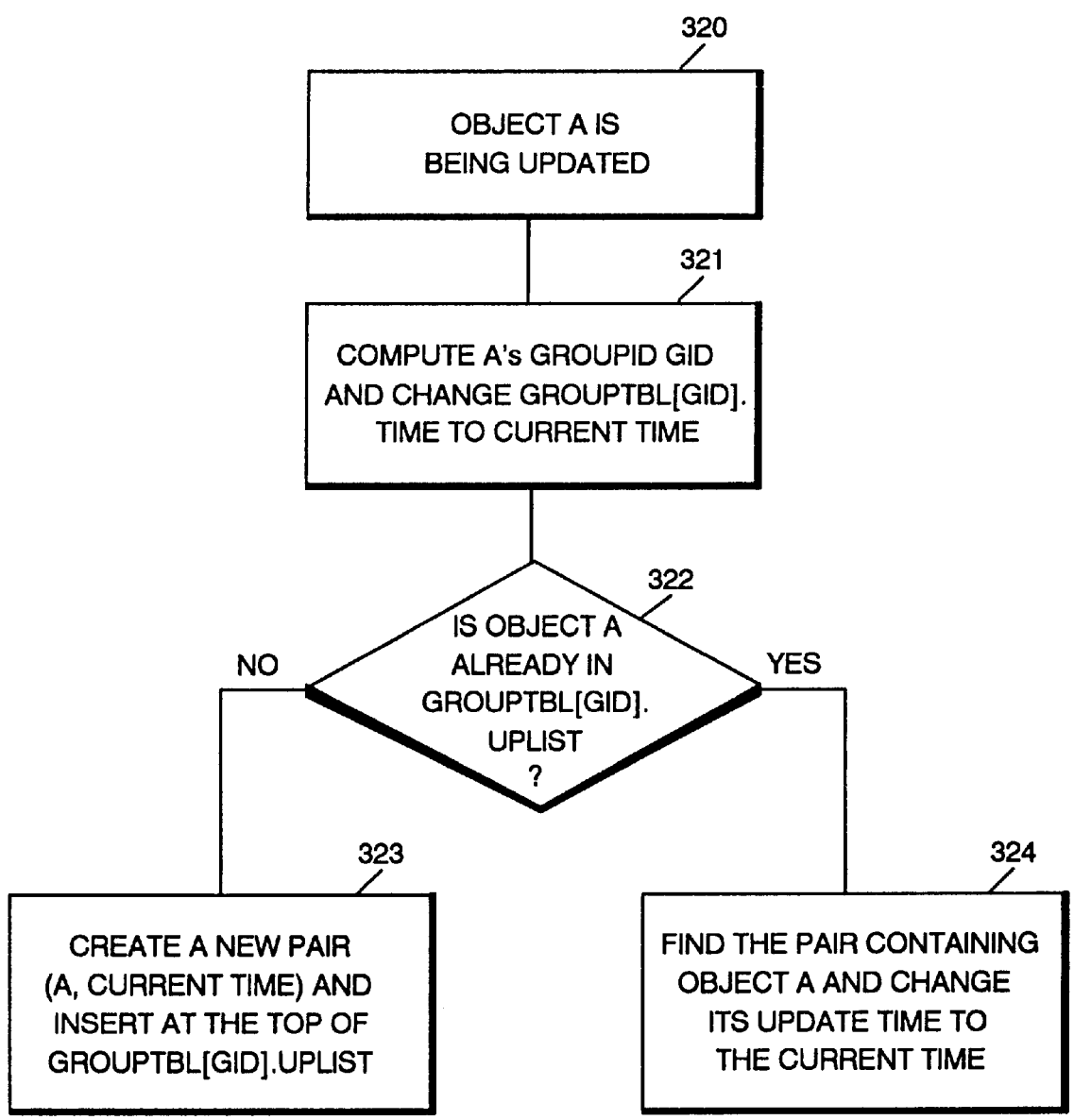
FIG. 3 is a flow diagram of a process for maintaining group update history.

FIG. 3 shows the flow chart for insert_grouptbl. When an object, for example A, is updated, 320, the corresponding group ID of object A is first computed 321. If such group ID is gid, then grouptbl[gid].time is changed to the current time. Next, all the pairs pointed to by grouptbl[gid].uplist are checked to see if any of them has the same object identifier as object A 322. If yes, then its corresponding update time is changed to the current time 324. Otherwise, a new pair is created and inserted at the top of grouptbl[gid].uplist for object A 323.

Figure 4:
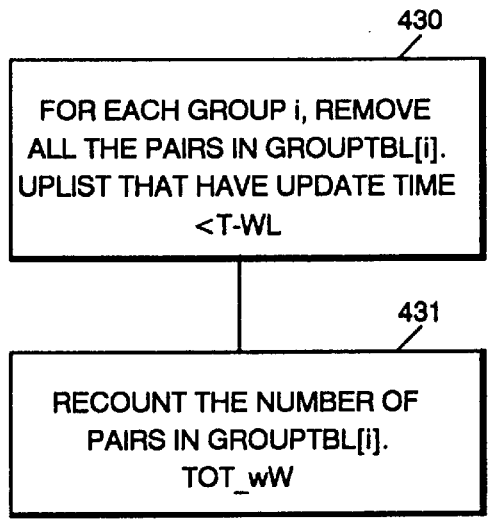
FIG. 4 is a flow diagram of a process for fast checking of group validity.

Every L units of time, the server 2 broadcasts an invalidation report and updates the grouptbl accordingly. FIG. 4 shows the flow chart of advance_grouptbl. For each grouptbl entry i, the server removes the pairs pointed to by grouptbl[i].uplist that have update times less than T−WL, where T is the current broadcast time 430. Also, for each grouptbl[i] the total number of pairs that have update times between T−WL and T−wL is recomputed for the new broadcast time T 431. The recomputation of grouptbl[i].tot_wW is for fast checking of group validity.

Figure 5:
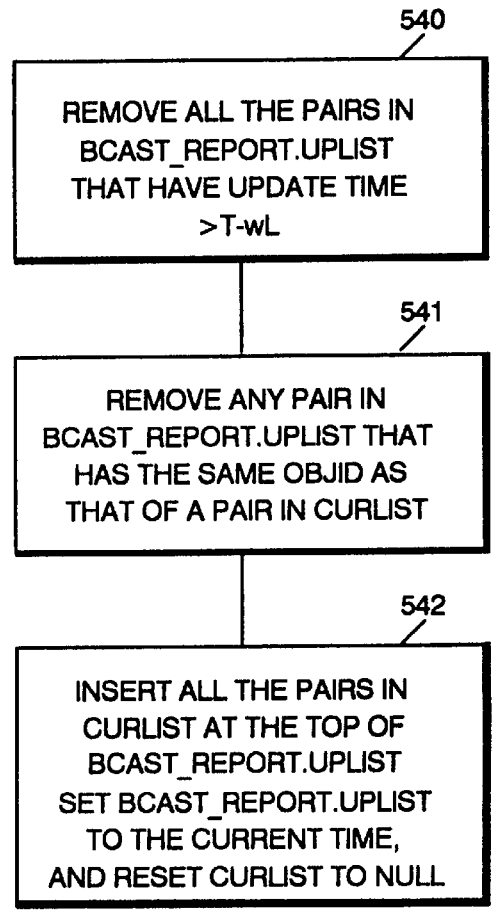
FIG. 5 is a flow diagram of a process for preparing a new broadcast report.

FIG. 5 shows the flow chart of preparing the new broadcast report, new_report. First, all the pairs pointed to by bcast_report.uplist that have update times less than T−wL are removed 540. After that, any pair pointed to by bcast_report.uplist that has the same object ID as that in curlist is also removed 541. Then, the entire list pointed to by curlist is inserted at the top of bcast_report.uplist, curlist is reset to NULL, and bcast_report.time is set to the current broadcast time 542. By doing so, the bcast_report will contain only the distinct object pairs that are updated in the most recent w broadcast intervals.

For a remote computer 1 to process queries with up-to-date data, all the queries are batched until it receives a new broadcast report.

Figure 6:
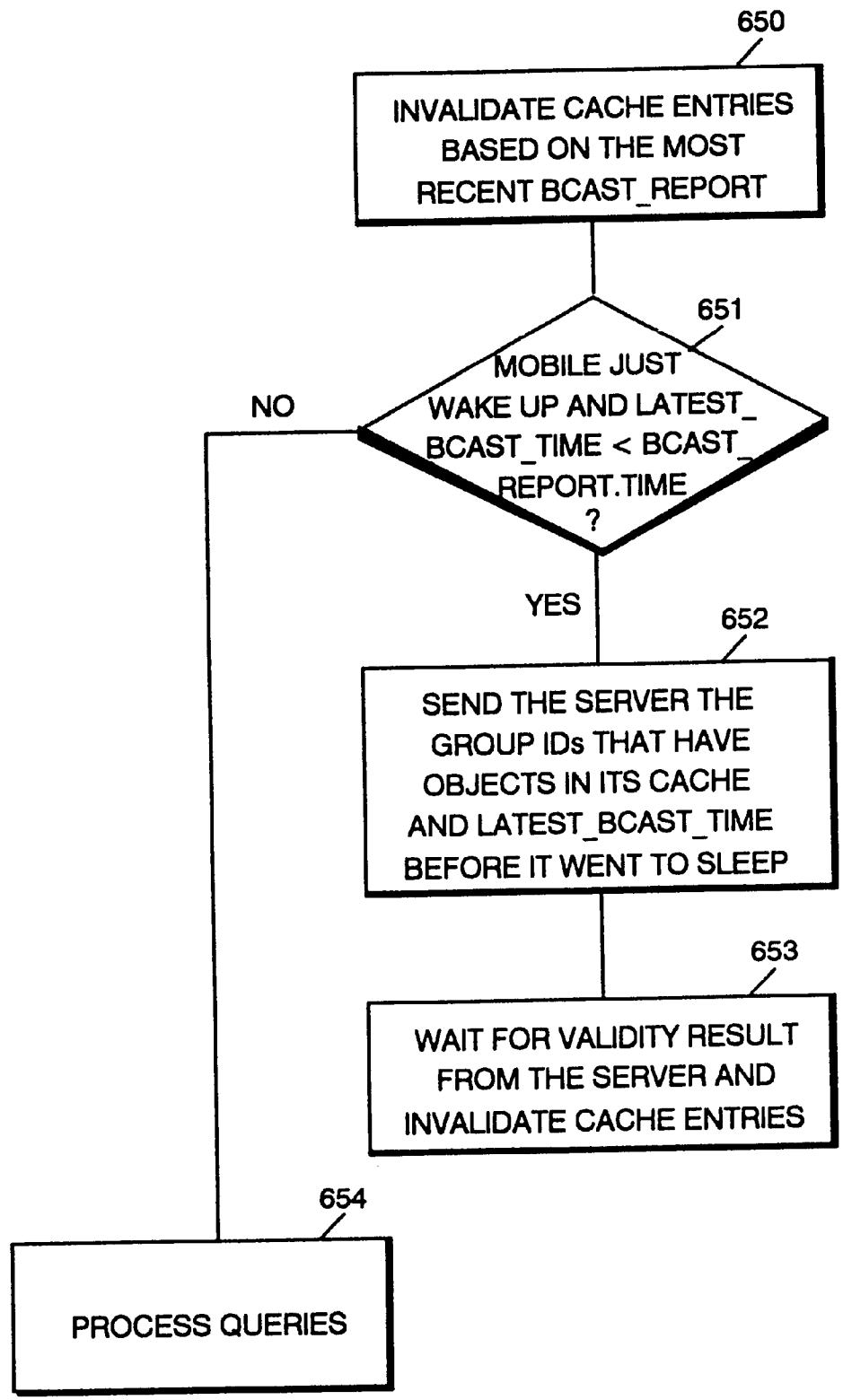
FIG. 6 is a flow diagram of query processing by a remote computer.

FIG. 6 shows the flow chart of query processing by a remote computer 1. Upon receiving a new bcast_report, the computer 1 first invalidates its cache contents based on this report 650. If this computer 1 has been disconnected and this is the first bcast-report it receives after wake up and latest_bcast_time<bcast_report.time 651, it then sends its latest_bcast_time and its group IDs to the server 2 for validity checking 652. It then waits for the validity results from the server 2 and invalidates its cache 653. Then the computer 1 processes all the queries 654. If objects cannot be found in the local cache (not shown), it sends requests to the server 254.

Figure 7:
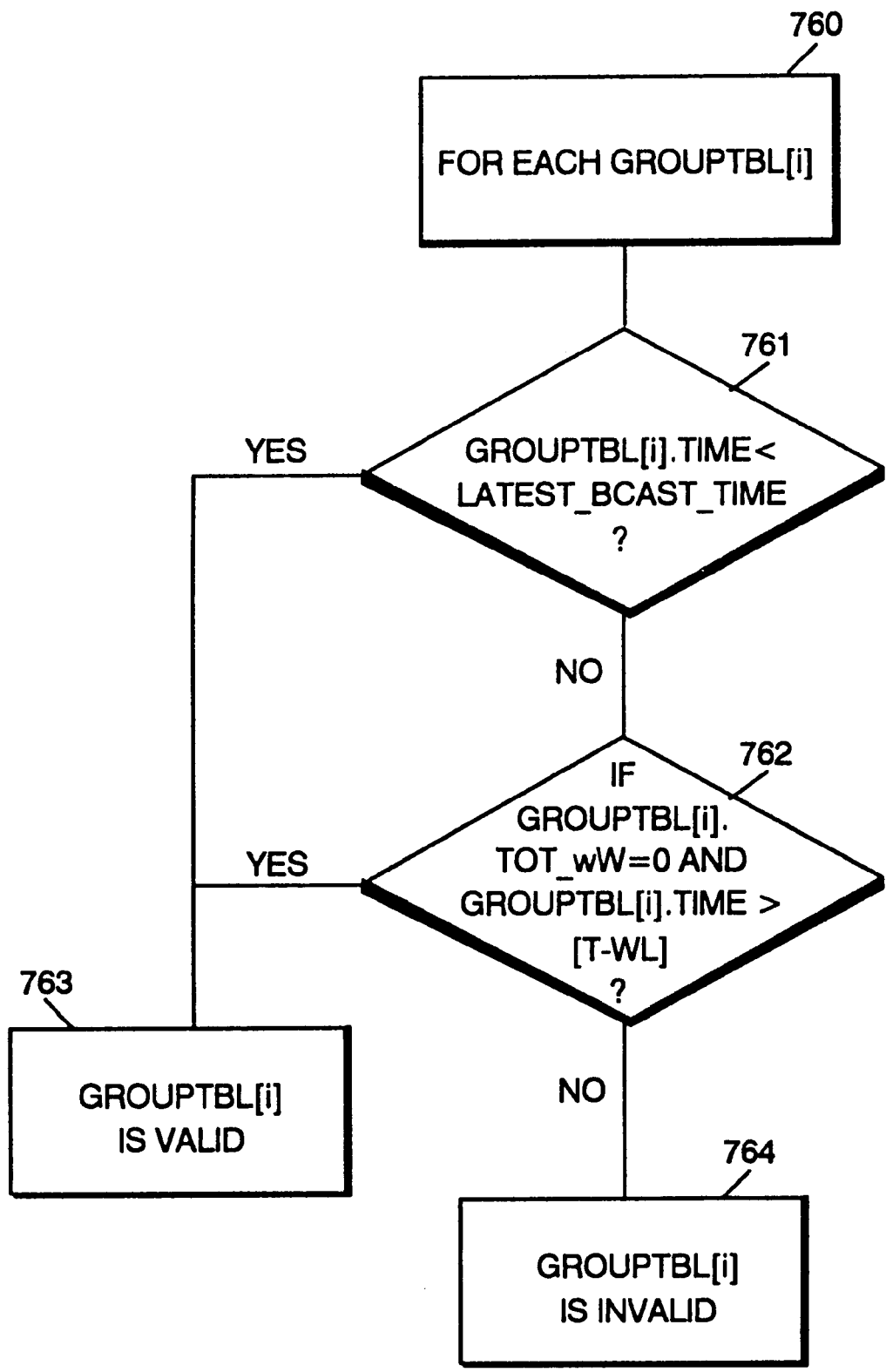
FIG. 7 is a flow diagram of group validity checking by a server.

For group validity checking, the server executes a simple process. FIG. 7 shows the flow chart of this validity-checking process. For each grouptbl[i] 760, the server 2 checks if grouptbl[i].time<latest_bcast_time 761. If yes, then grouptbl[i] is valid 763. If not, then it further checks if grouptbl[i].tot_wW=0 and grouptbl[i].time>(T−WL) 762. If yes, then grouptbl[i] is also valid 763. Otherwise, grouptbl[i] is invalid 764.

Although the present invention and its advantages have been described in detail, it should be understood that various changes, substitutions and alterations can be made herein without departing from the spirit and scope of the invention as defined by the appended claims.

What is claimed is:

1. A method, for maintaining data coherency between one or more servers and one or more remote units adapted to operate in a disconnected mode, in an information handling system, comprising the steps of:

storing data objects in one or more servers;

grouping data objects stored in the one or more servers into one or more groups;

periodically broadcasting one or more invalidation reports from one or more of the servers to one or more of the remote units, each invalidation report comprising information related to one or more data objects updated during one or more most recent broadcast intervals;

excluding, by the one or more servers, one or more recently updated objects from a group; and testing a group validity, when requested by a remote unit, without object-by-object comparison.

2. A method of reducing overhead in a communications system according to claim 1, further comprising the step of invalidating contents of caches in said one or more remote computers based on information contained in said invalidation reports.

3. A method of reducing overhead in a communications system according to claim 1, further comprising the step of maintaining at said one or more servers a latest update time of a group and a number of objects in a group which are updated during a predetermined time interval.

4. A method of reducing overhead in a communications system according to claim 1, further comprising the steps of:

waiting for a next invalidation broadcast to invalidate cache entries in one of said remote computers; and sending a time identifier of a last invalidation report received by said remote computer before a most recent disconnection of said remote computer.

5. A method of reducing overhead in a communications system according to claim 1, further comprising the step of determining at said one or more servers a validity of a group which excludes one or more objects updated during a predetermined broadcast interval.

6. An information handling system, comprising:

a communications network;

one or more servers connected to the communications network for handling information to be processed and transmitted across the communications network;

one or more remote terminals adapted to operate in a disconnected mode for an arbitrary time interval and adapted to operate in communication with the one or more servers, each of the remote terminals comprising means responsive to an invalidation report broadcast by one of the servers for invalidating cache contents identified in the invalidation report;

each of said servers comprising means for storing data objects;

means for grouping data objects into one or more groups;

means for periodically broadcasting one or more invalidation reports to the one or more remote units, each invalidation report comprising information related to one or more data objects updated during one or more most recent broadcast intervals;

means for excluding one or more recently updated objects from a group; and means for testing a group validity, when requested by a remote unit, without object-by-object comparison.

7. A data communications system according to claim 6, further comprising:

means in said one or more servers for dynamically excluding one or more most recently updated objects from a group of objects; and means for efficiently checking by said one or more servers a group validity without object by object comparisons.

8. A data communications system according to claim 6, further comprising:

means for maintaining at said one or more servers a latest update time of each group of objects and a number of objects in each said group that have been updated during a predetermined time interval.

\* \* \* \* \*